US012026958B2

(12) United States Patent
Corrodi et al.

(10) Patent No.: US 12,026,958 B2
(45) Date of Patent: Jul. 2, 2024

(54) VEHICLE CAMERA MIRROR SYSTEM WITH ADJUSTABLE VIDEO FEED

(71) Applicant: Stoneridge, Inc., Novi, MI (US)

(72) Inventors: Brad Corrodi, Princeton, NJ (US); Troy Otis Cooprider, White Lake, MI (US)

(73) Assignee: Stoneridge, Inc., Novi, MI (US)

( * ) Notice: Subject to any disclaimer, the term of this patent is extended or adjusted under 35 U.S.C. 154(b) by 0 days.

(21) Appl. No.: 17/692,726

(22) Filed: Mar. 11, 2022

(65) Prior Publication Data
US 2022/0292841 A1 Sep. 15, 2022

Related U.S. Application Data

(60) Provisional application No. 63/160,119, filed on Mar. 12, 2021.

(51) Int. Cl.
*G06V 20/58* (2022.01)
*B60R 1/24* (2022.01)
*B60R 1/26* (2022.01)
*G06F 3/01* (2006.01)
(Continued)

(52) U.S. Cl.
CPC ............... *G06V 20/58* (2022.01); *B60R 1/24* (2022.01); *B60R 1/26* (2022.01); *G06F 3/013* (2013.01); *H04N 5/2628* (2013.01); *H04N 7/18* (2013.01)

(58) Field of Classification Search
CPC .. G06V 20/58; B60R 1/24; B60R 1/26; B60R 1/00; B60R 2300/306; G06F 3/013; H04N 5/2628
See application file for complete search history.

(56) References Cited

U.S. PATENT DOCUMENTS 9,376,059 B2 * 6/2016 Mauderer ................ B60R 1/00
9,783,204 B2 * 10/2017 Gordon ............... G06V 20/597
10,116,873 B1 * 10/2018 Campbell ............... G06T 7/246
(Continued)

FOREIGN PATENT DOCUMENTS

DE  102010033786  1/2012
WO  2014204794  12/2014

OTHER PUBLICATIONS

International Search Report and Written Opinion for International Patent Application No. PCT/US22/19939 dated Jun. 20, 2022.
(Continued)

*Primary Examiner* — Boubacar Abdou Tchoussou
(74) *Attorney, Agent, or Firm* — Carlson, Gaskey & Olds, P.C.

(57) ABSTRACT

A vehicle display system according to an example embodiment of the present disclosure includes a camera configured to record images of an area outside a vehicle; a display configured to display a video feed of the recorded images to an occupant of the vehicle (e.g., on a display disposed within a vehicle cabin of the vehicle); and a processor operatively connected to the camera and display. The processor is configured to detect one or more objects in the recorded images; receive a selection of a particular one of the one or more objects from a vehicle occupant; and adjust the video feed based on the selection to keep the particular one of the one or more objects in a field of view of the video feed as the object moves relative to the vehicle.

15 Claims, 11 Drawing Sheets

(51) Int. Cl.
    *H04N 5/262*     (2006.01)
    *H04N 7/18*     (2006.01)

(56) References Cited

U.S. PATENT DOCUMENTS

| | | | |
|---|---|---|---|
| 10,239,456 B1 | 3/2019 | Tao et al. | |
| 10,296,083 B2* | 5/2019 | Sung | G09G 5/003 |
| 10,810,966 B1 | 10/2020 | Landgraf | |
| 10,843,628 B2* | 11/2020 | Kawamoto | G06F 3/1423 |
| 10,946,800 B2* | 3/2021 | Hayashida | H04N 23/90 |
| 10,967,852 B2* | 4/2021 | Han | B60W 50/14 |
| 11,220,214 B1* | 1/2022 | Meier | H04N 5/2628 |
| 11,372,110 B2* | 6/2022 | Takenaka | H04N 7/181 |
| 11,479,177 B2* | 10/2022 | Oba | B60R 1/00 |
| 2016/0046236 A1* | 2/2016 | Mozer | B60R 1/081 |
| | | | 348/148 |
| 2016/0196823 A1* | 7/2016 | Yellambalase | G10L 15/22 |
| | | | 348/148 |
| 2017/0083773 A1 | 3/2017 | Greenwood et al. | |
| 2017/0129405 A1* | 5/2017 | Oba | B60R 1/12 |
| 2017/0336797 A1 | 11/2017 | Abe et al. | |
| 2019/0075253 A1* | 3/2019 | Wada | H04N 7/183 |
| 2021/0081684 A1* | 3/2021 | Yamamoto | B62D 15/0275 |
| 2021/0362654 A1* | 11/2021 | Iida | B60R 1/12 |
| 2022/0083794 A1* | 3/2022 | Bronte | G06V 20/59 |
| 2022/0111794 A1* | 4/2022 | Taniguchi | B60R 1/25 |

OTHER PUBLICATIONS

International Preliminary Report on Patentability for International Patent Application No. PCT/US22/19939 dated Sep. 21, 2023.

\* cited by examiner

VEHICLE CAMERA MIRROR SYSTEM WITH ADJUSTABLE VIDEO FEED

CROSS-REFERENCE TO RELATED

This application claims the benefit of U.S. Provisional Application No. 63/160,119, filed on Mar. 12, 2021, the disclosure of which is incorporated by reference herein in its entirety.

BACKGROUND

This application relates to camera mirror systems for vehicles, such as commercial vehicles.

Camera mirror systems (CMS) supplement or replace traditional mirrors of vehicles with video feeds from cameras disposed outside of the vehicles. CMS utilize one or more cameras to provide an enhanced field of view to a vehicle operator. In some examples, CMS cover a larger field of view than a conventional mirror, or include views that are not fully obtainable via a conventional mirror. However, CMS generally provide static video feeds that do not behave like traditional mirrors, that provide different fields of view when looked at from different angles.

SUMMARY OF THE INVENTION

A vehicle display system according to an example embodiment of the present disclosure includes a camera configured to record images of an area outside a vehicle; a display configured to display a video feed of the recorded images to an occupant of the vehicle (e.g., on a display disposed within a vehicle cabin of the vehicle); and a processor operatively connected to the camera and display. The processor is configured to detect one or more objects in the recorded images; receive a selection of a particular one of the one or more objects from a vehicle occupant; and adjust the video feed based on the selection to keep the particular one of the one or more objects in a field of view of the video feed as the object moves relative to the vehicle.

In a further embodiment of the foregoing embodiment, to adjust the video feed, the processor is configured to adjust a panning of the video feed based on the selection, such that the particular one of the one or more objects remains in the field of view after the panning.

In a further example of any of the foregoing embodiments, to adjust the video feed, the processor is configured to adjust a magnification of the video feed based on the selection, such that the particular one of the one or more objects is still in the field of view after magnification.

In a further embodiment of any of the foregoing embodiments, the camera is a first camera, and prior to the adjustment the video feed includes images from the first camera and excludes images from a second camera that is separate from the first camera. To adjust the video feed, the processor is configured to commence including images from the second camera in the video feed.

In a further embodiment of any of the foregoing embodiments, the first camera or the second camera is configured to provide a video feed of an area in front of or behind the vehicle.

In a further example of any of the foregoing embodiments, the processor is configured to receive the selection as a voice command, a gesture command, or a touchscreen command.

In a further example of any of the foregoing embodiments, the processor is configured to detect a video adjustment command from the vehicle occupant. The video adjustment command includes one of a panning command to adjust a field of view of the video feed and a magnification command to increase or decrease a magnification of the video feed. The processor is also configured to adjust the video feed based on the video adjustment command.

A vehicle display system according to an example embodiment of the present disclosure includes a camera configured to provide a video feed of an area outside a vehicle; a display configured to display the video feed to an occupant of the vehicle (e.g., on a display disposed within a vehicle cabin of the vehicle); at least one sensor configured to obtain data about at least one bodily characteristic of a vehicle occupant; and a processor operatively connected to the camera, display, and at least one sensor. The processor is configured to determine, based on the data from the at least one sensor, whether the vehicle occupant is providing a video adjustment command for the video feed on the display; adjust the video feed on the display based on the video adjustment command being provided during a first vehicle operational state; and disregard the data about the at least one bodily characteristic of the vehicle occupant obtained during a second vehicle operational state that is different from the first vehicle operational state.

In a further example of the foregoing embodiment, the at least one bodily characteristic includes a gaze direction.

In a further example of any of the foregoing embodiments, the at least one bodily characteristic includes a gaze direction and a head rotation direction.

In a further example of any of the foregoing embodiments, the at least one bodily characteristic includes a head tilt direction.

In a further example of any of the foregoing embodiments, the at least one bodily characteristic includes a head tilt direction and a torso lean direction.

In a further example of any of the foregoing embodiments, the at least one bodily characteristic includes a hand movement, a finger movement, or both.

In a further example of any of the foregoing embodiments, the first vehicle operational state corresponds to a magnitude of one of a deceleration and an acceleration of the vehicle being less than a predefined threshold. The second vehicle operational state corresponds to the magnitude of the one of the deceleration and the acceleration of the vehicle being greater than the predefined threshold.

In a further example of any of the foregoing embodiments, the video adjustment command corresponds to the vehicle occupant looking at the display and attempting to look outside a current field of view of the video feed on the display. To adjust the video feed on the display, the processor is configured to adjust a field of view of the video feed on the display.

In a further example of any of the foregoing embodiments, to adjust the field of view of the video feed on the display, the processor is configured to determine, based on the data from the at least one sensor, an area of interest outside the video feed that the vehicle occupant is trying to view; and adjust the field of view of the video feed so that the video feed on the display includes the area of interest.

In a further example of any of the foregoing embodiments, the display is configured to display a cropped version of the video feed. To adjust the field of view of the video feed, the processor is configured to adjust a cropping of the video feed.

In a further example of any of the foregoing embodiments, the video adjustment command corresponds to at least one of the occupant leaning their torso forward or backward from an initial torso position, and the occupant tilting their head forwards or backwards from an initial head position. To adjust the video feed on the display, the processor is configured to adjust a magnification of the video feed on the display.

In a further example of any of the foregoing embodiments, the processor is also configured to receive video adjustment commands as voice commands or gesture commands.

A method according to an example embodiment of the present disclosure includes recording images of an area outside a vehicle cabin of a vehicle with a camera, displaying a video feed of the recorded images to an occupant of the vehicle in the vehicle cabin (e.g., on a display disposed within the vehicle cabin), detecting one or more objects in the recorded images, receiving a selection of a particular one of the one or more objects from a vehicle occupant, and adjusting the video feed based on the selection to keep the particular one of the one or more objects in a field of view of the video feed as the object moves relative to the vehicle.

In a further example of the foregoing embodiment, the camera is a first camera, adjusting the video feed includes one or more of: adjusting a panning of the video feed; adjusting a magnification of the video feed while still keeping the particular one of the one or more objects in the field of view; commencing inclusion of images of the particular one of the one or more objects in the video feed from a second camera that is separate from the first camera.

In a further example of any of the foregoing embodiments, the first camera or the second camera is configured to provide a video feed of an area in front of or behind the vehicle.

A method according to an example embodiment of the present disclosure includes recording images of an area outside a vehicle cabin with a camera; displaying a video feed of the recorded images to an occupant of the vehicle (e.g., on a display disposed within the vehicle cabin); determining, based on data about at least one bodily characteristic of a vehicle occupant from at least one sensor, whether the vehicle occupant is providing a video adjustment command for the video feed on the display; adjusting the video feed on the display based on the video adjustment command being provided during a first vehicle operational state; and disregarding the data about the at least one bodily characteristic of the vehicle occupant obtained during a second vehicle operational state that is different from the first vehicle operational state.

In a further example of the foregoing embodiment, the at least one bodily characteristic includes a gaze direction.

In a further example of any of the foregoing embodiments, the at least one bodily characteristic includes a gaze direction and a head rotation direction.

In a further example of any of the foregoing embodiments, the at least one bodily characteristic includes a head tilt direction.

In a further example of any of the foregoing embodiments, the at least one bodily characteristic includes a head tilt direction and a torso lean direction.

In a further example of any of the foregoing embodiments, the at least one bodily characteristic includes a hand movement, a finger movement, or both.

In a further example of any of the foregoing embodiments, adjusting the video feed on the display includes at least one of adjusting a cropping of the video feed on the display; adjusting a magnification of the video feed on the display; adjusting a field of view of the video feed on the display.

In a further example of any of the foregoing embodiments, the first vehicle operational state corresponds to a magnitude of one of a deceleration and an acceleration of the vehicle being less than a predefined threshold. The second vehicle operational state corresponds to the magnitude of the one of the deceleration and the acceleration of the vehicle being greater than the predefined threshold.

In a further example of any of the foregoing embodiments, the video adjustment command corresponds to the vehicle occupant looking at the display and attempting to look outside a current field of view of the video feed on the display. Adjusting the video feed on the display includes adjusting a field of view of the video feed on the display.

In a further example of any of the foregoing embodiments, adjusting the video feed includes determining, based on the data from the at least one sensor, an area of interest outside the video feed that the vehicle occupant is trying to view, and adjusting a field of view of the video feed also includes so that the video feed on the display includes the area of interest.

In a further example of any of the foregoing embodiments, adjusting a field of view of the video feed comprises adjusting how the video feed is cropped for display on the display.

In a further example of any of the foregoing embodiments, the video adjustment command corresponds to at least one of the occupant leaning their torso forward or backward from an initial torso position, and the occupant tilting their head forwards or backwards from an initial head position. Adjusting the video feed on the display includes adjusting a magnification of the video feed on the display.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
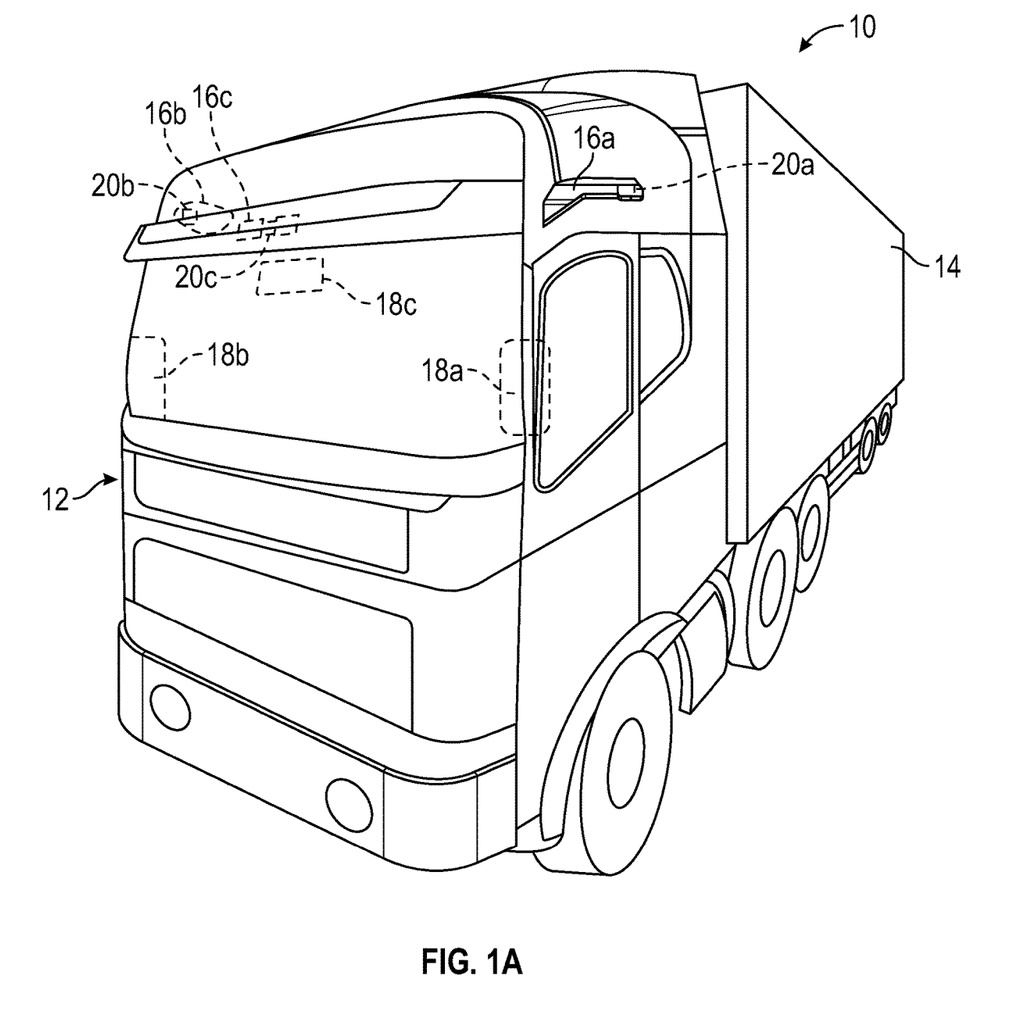
FIG. 1A is a schematic front view of a commercial truck with a CMS used to provide at least Class II and Class IV views.
Figure 1B:
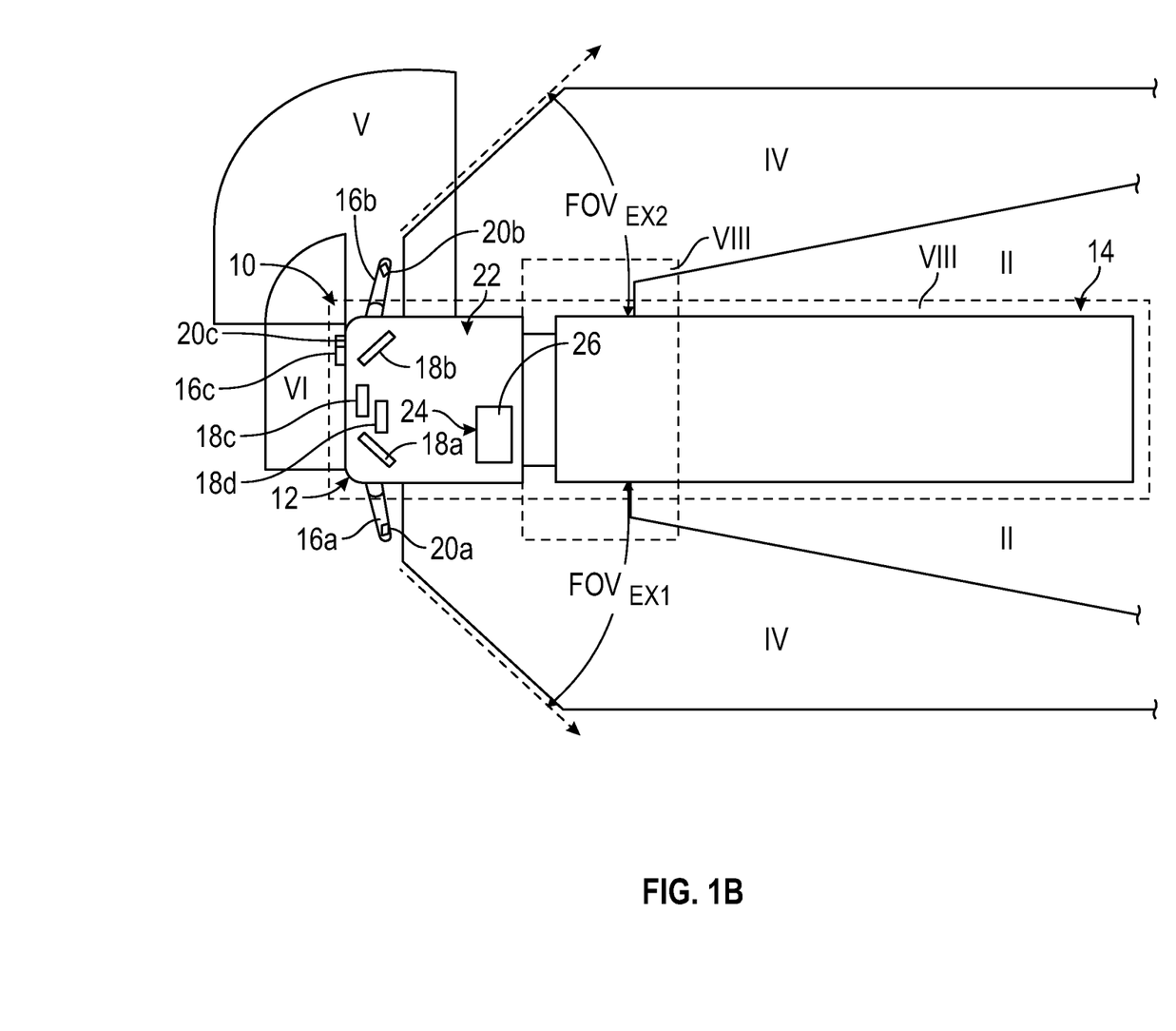
FIG. 1B is a schematic top elevational view of a commercial truck with an example camera mirror system providing Class II, Class IV, Class V, Class VI, and Class VIII views.
Figure 1C:
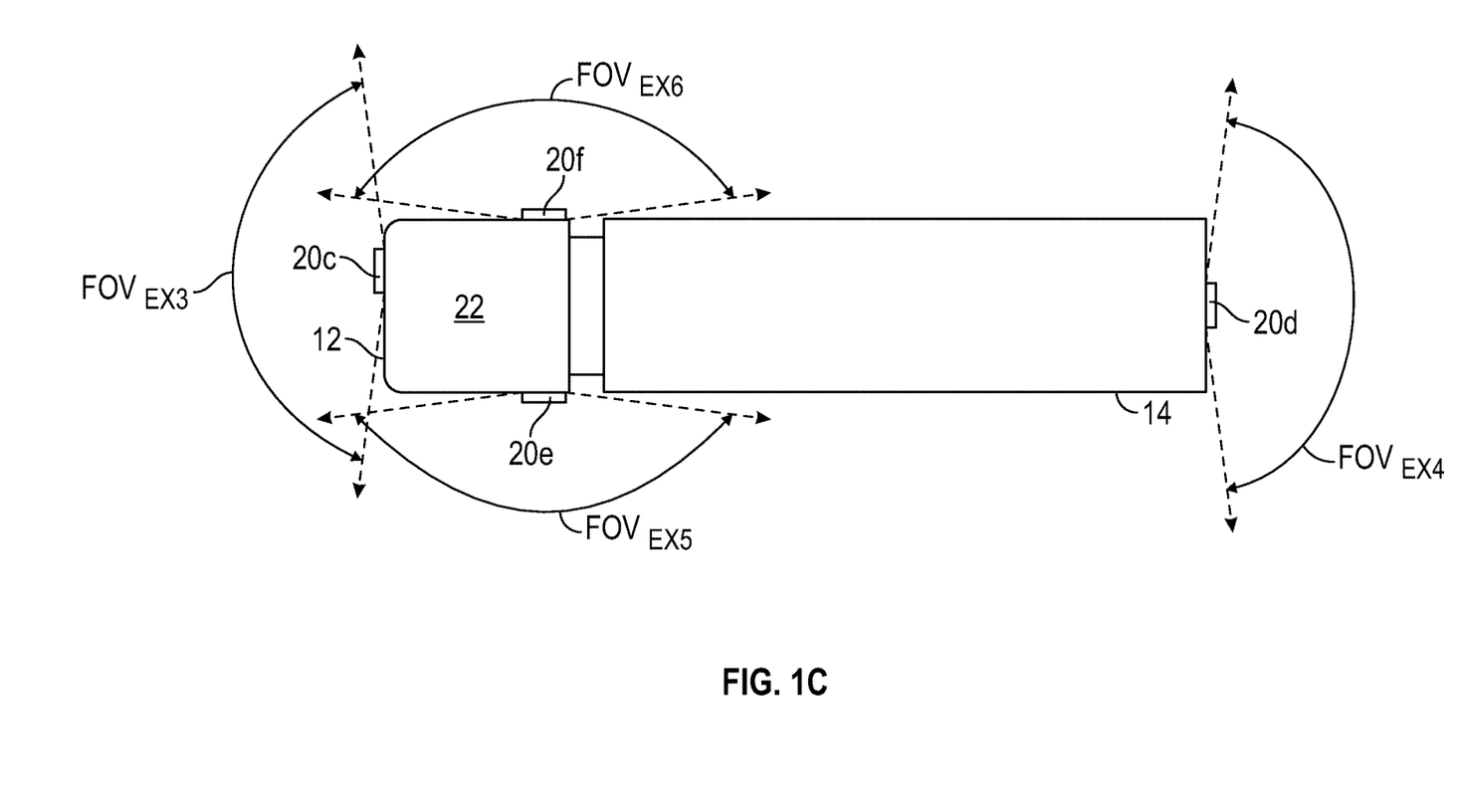
FIG. 1C is a schematic top elevational view of a commercial truck with a camera mirror system providing example implementations of Class V, Class VI, and Class VIII views.

A schematic view of an example commercial vehicle 10 is illustrated in FIGS. 1A, 1B, and 1C. The commercial vehicle 10 includes a tractor 12 for pulling a trailer 14. The tractor 12 includes a vehicle cabin 22. Although a commercial truck is contemplated in this disclosure, the invention may also be applied other types of vehicles. The vehicle 10 incorporates a camera mirror system (CMS) 15 (see FIG. 2) that has driver and passenger side camera arms 16a, 16b mounted to the outside of the tractor 12. If desired, the camera arms 16a, 16b may include conventional mirrors integrated with them as well, although the CMS 15 may be used to entirely replace mirrors.

Each of the camera arms 16a, 16b includes a base that is secured to, for example, the tractor 12. A pivoting arm is supported by the base and may articulate relative thereto. At least one rearward facing camera 20a, 20b is arranged respectively within the camera arms 16a, 16b. The exterior cameras 20a, 20b respectively provide an exterior field of view $FOV_{EX1}$, $FOV_{EX2}$ that each include at least one of the Class II and Class IV views (see FIG. 1B), which are legal prescribed views in the commercial trucking industry. Multiple cameras also may be used in each camera arm 16a, 16b to provide these views, if desired (e.g., lenses having differing focal lengths, with one of the lenses being a wide angle lens). Each arm 16a, 16b may also provide a housing that encloses electronics that are configured to provide various features of the CMS 15.

As shown in FIG. 1C, additional cameras 20c, 20d, 20e, and 20f may be provided, which have corresponding fields of view $FOV_{EX3}$ (corresponding to Class VI), $FOV_{EX4}$ (corresponding to Class VIII), $FOV_{EX5}$ (corresponding to Class IV, Class V, and Class VIII), and $FOV_{EX6}$ (corresponding to Class IV, Class V, and Class VIII).

The vehicle cabin 22 includes a plurality of electronic displays 18a-b for showing video from the plurality of cameras 20a-f (see FIGS. 1A-C). In the example of FIGS. 1A-C, first and second video displays 18a, 18b are arranged on each of the driver and passenger sides within the vehicle cabin 22 on or near the A-pillars to display Class II and Class IV views on its respective side of the vehicle 10, which provide rear facing side views along the vehicle 10 that are captured by the exterior cameras 20a, 20b.

A camera housing 16c and camera 20c may be arranged at or near the front of the vehicle 10 to provide, for example, Class V, Class VI, and/or Class VIII views (see FIG. 1B). A third display 18c arranged within the vehicle cabin 22 near the top center of the windshield may be used to display the Class V and Class VI views from the camera 20C, for example, which are toward the front of the vehicle 10, to the driver.

A fourth display 18d may also be provided in the vehicle cabin 22 as well, and may be provided as part of an instrument cluster or center console, for example. The fourth display 18d may be used to provide images from cameras 20d, 20e, and/or 20f, for example, which are shown in FIG. 1C, and provide Class VIII views. Of course, it is understood that these are non-limiting examples, and that other quantities of cameras and other camera-to-display mappings could be used.

Figure 2:
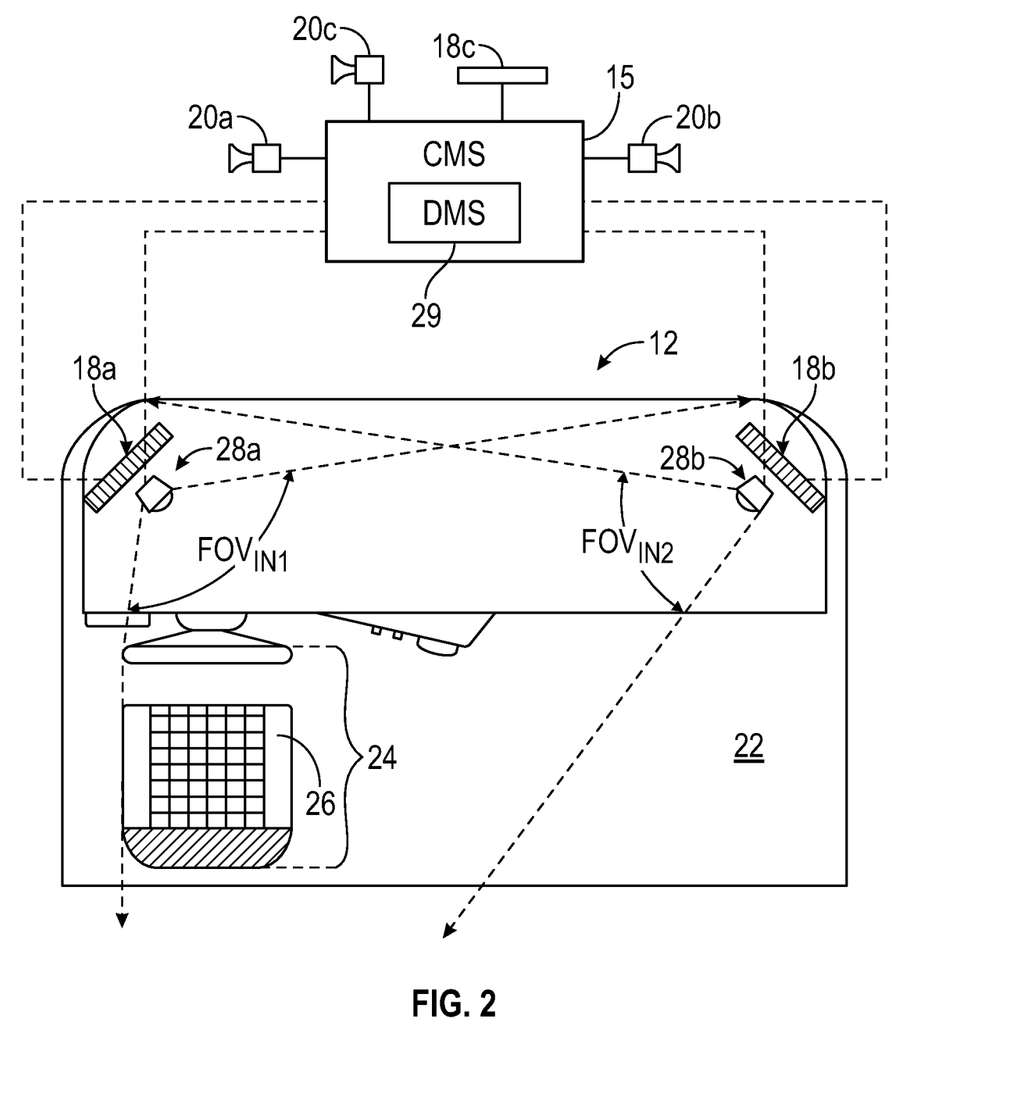
FIG. 2 is a schematic top perspective view of an example vehicle cabin including displays and interior cameras.

Referring now to FIG. 2, with continued reference to FIGS. 1A-C, the displays 18a-d face a driver region 24 within the vehicle cabin 22 where an operator is seated on a driver seat 26. In the example of FIG. 2, the CMS 15 includes a driver monitoring system (DMS) 29 to evaluate one or more bodily characteristics of a vehicle occupant (e.g., a driver), such as a pose, head position, and/or gaze, which the CMS 15 may use to determine if the operator is looking at a particular one of the displays 18 and attempting to look outside a current field of view of the video feed on the particular one of the displays 18. In some examples, the DMS 29 is also configured to detect gestures from a vehicle occupant, such as hand gestures, and/or voice commands and to interpret those as commands for adjusting the video feeds shown on one or more of the various displays 18, using voice command interpretation and/or gesture command interpretation techniques known to those of ordinary skill in the art.

The example DMS 29 of FIG. 2 includes first and second interior cameras 28a, 28b that are arranged in the vehicle cabin 22 near the first and second displays 18a, 18b and are configured to capture vehicle occupant (e.g., driver) images within the vehicle cabin 22. The first and second interior cameras 28a, 28b respectively provide first and second interior fields of view $FOV_{IN1}$, $FOV_{IN2}$ that at least partially overlap one another in the driver region 24. The first display 18a is positioned such that it is in the second interior field of view $FOV_{IN2}$, and the second display 18b is positioned such that it is in the first interior field of view $FOV_{IN1}$. In addition to or as an alternative to the interior cameras 28a-b, a gaze detection sensor 31 may be included to track a gaze of the vehicle occupant. In one example, the gaze detection sensor 31 includes an infrared (IR) sensor that uses known techniques to detect a gaze direction of the vehicle occupant.

Figure 3:
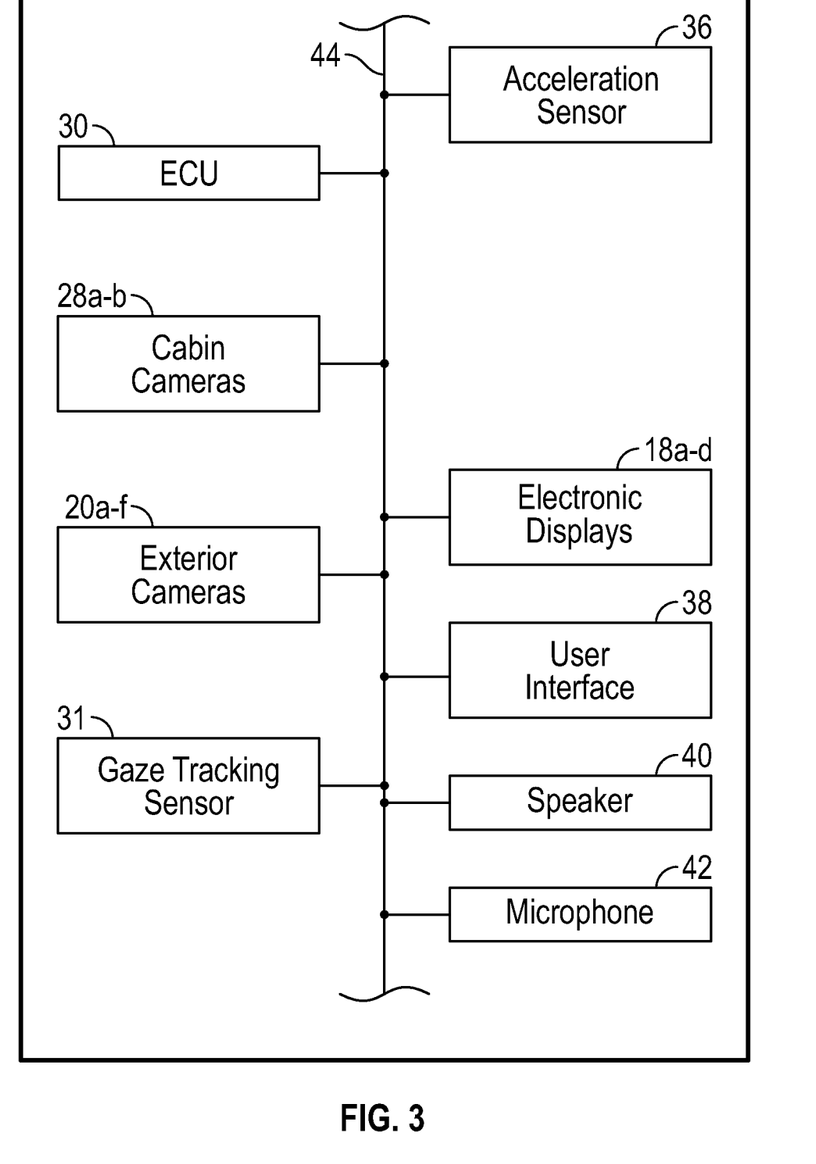
FIG. 3 schematically illustrates components of an example driver monitoring system for the vehicle in FIGS. 1A-C.

Referring now to FIG. 3, an electronic control unit (ECU) 30, which acts as a controller, is operatively connected to the cabin cameras 28a-b, the exterior cameras 20a-f, the gaze tracking sensor 31, an acceleration sensor 36, the electronic displays 18a-d, a user interface 38, a speaker 40, and a microphone 42. In the example of FIG. 3, the ECU 30 is in communication with these components through a vehicle data bus 44, such as a Controller Area Network (CAN) bus. However, it is understood that other connections could be utilized (wired or wireless). The cabin cameras 28a-b and gaze tracking sensor 31 are part of the DMS 29. In one example, the user interface 38 is a touchscreen interface associated with one or more of the displays 18a-d.

Figure 4:
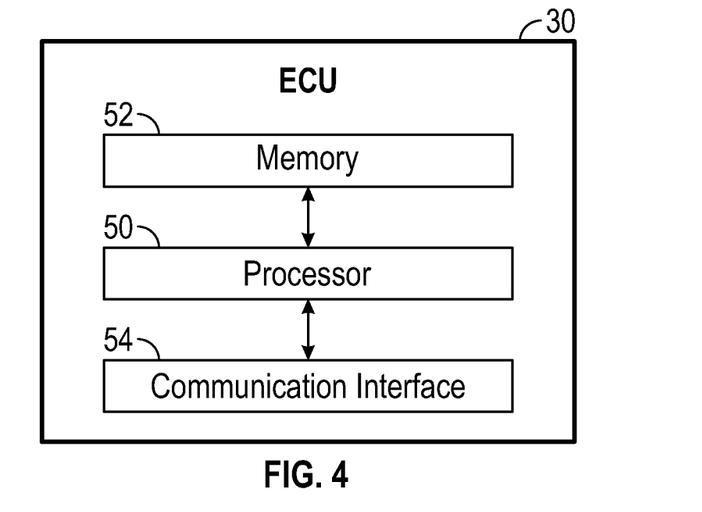
FIG. 4 schematically illustrates an electronic control unit of FIG. 3 in greater detail.

FIG. 4 schematically illustrates the ECU 30 in greater detail. The ECU 30 includes a processor 50 operatively connected to memory 52, and a communication interface 54. The processor 50 includes one or more processing circuits, such as microprocessors, microcontrollers, application specific integrated circuits (ASICs), or the like. The memory 52 may include one or several types of memory such as read-only memory (ROM), random-access memory, cache memory, flash memory devices, optical storage devices, etc. The memory 52 may have a distributed architecture, where various components are situated remotely from one another, but may be accessed by the processor 50. The memory 52 stores instructions that configure the processor 50 to perform the one or more steps described herein. The communication interface 54 provides for communication between the processor 50 and other components shown in FIG. 3 (e.g., a wired and/or wireless connection, such as through the vehicle data bus 44).

In one example, the ECU 30 is operable to detect video adjustment commands from a vehicle occupant. The adjustment may include adjusting a field of view of the video feed on a particular display 18 (e.g., a cropping adjustment) and/or increasing or decreasing a magnification of the video feed, for example.

In one example, the command can be received through the user interface 38, as a spoken voice command through the microphone 42 (e.g., "zoom in", "pan left", etc.), or as a gesture detected through one or more of the cabin cameras 28*a-b*. The gesture may include pinching for zooming out, or a reverse pinch (spreading index finger and thumb apart from each other) for zooming in, and/or rotating a hand and/or fingers for a panning command, for example.

Figure 5:
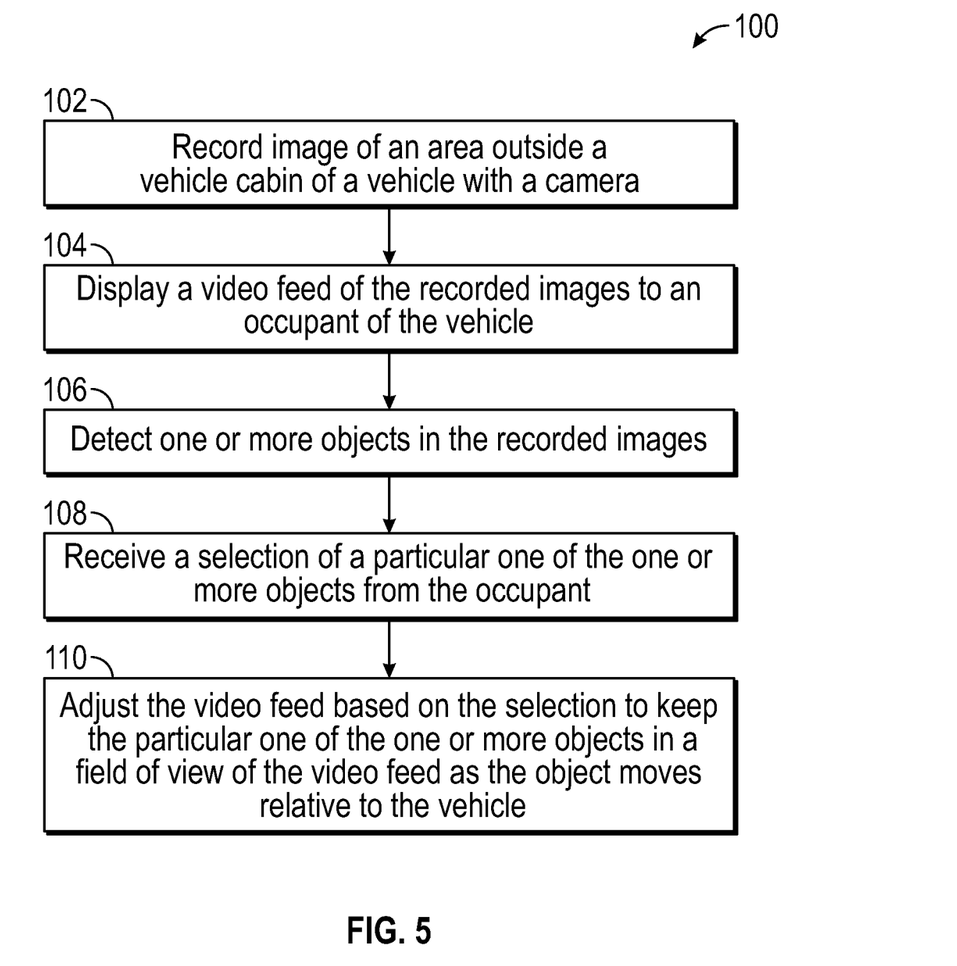
FIG. 5 is a flowchart of a method for adjusting a video feed of a camera mirror system according to a tracking mode.

FIG. 5 is a flowchart 100 of a method for adjusting a video feed on one or more displays of the CMS 15 according to a "tracking mode." Images are recorded of an area outside of the vehicle cabin 22 of the vehicle 10 using one or more of the cameras 20 (step 102). A video feed of the images is displayed to an occupant of the vehicle cabin (e.g., on a display 18 disposed within the vehicle cabin) (step 104). One or more objects are detected in the recorded images (step 106). A selection of a particular one of the one or more objects is received from a vehicle occupant, such as a driver (step 108). The video feed on the display 18 is adjusted based on the selection to keep the particular one of the one or more objects in a field of view of the video feed as the object moves relative to the vehicle 10 (step 110).

An example of the method of FIG. 5 will now be discussed in connection with FIG. 6, which shows an example of the display 18A, in which the display includes a first display area 60A which provides a Class IV view, and a second display area 60B that provides a Class II view. The display areas 60A-B can be discrete displays (e.g., separate LCDs) or can be areas of a single display.

Figure 6:
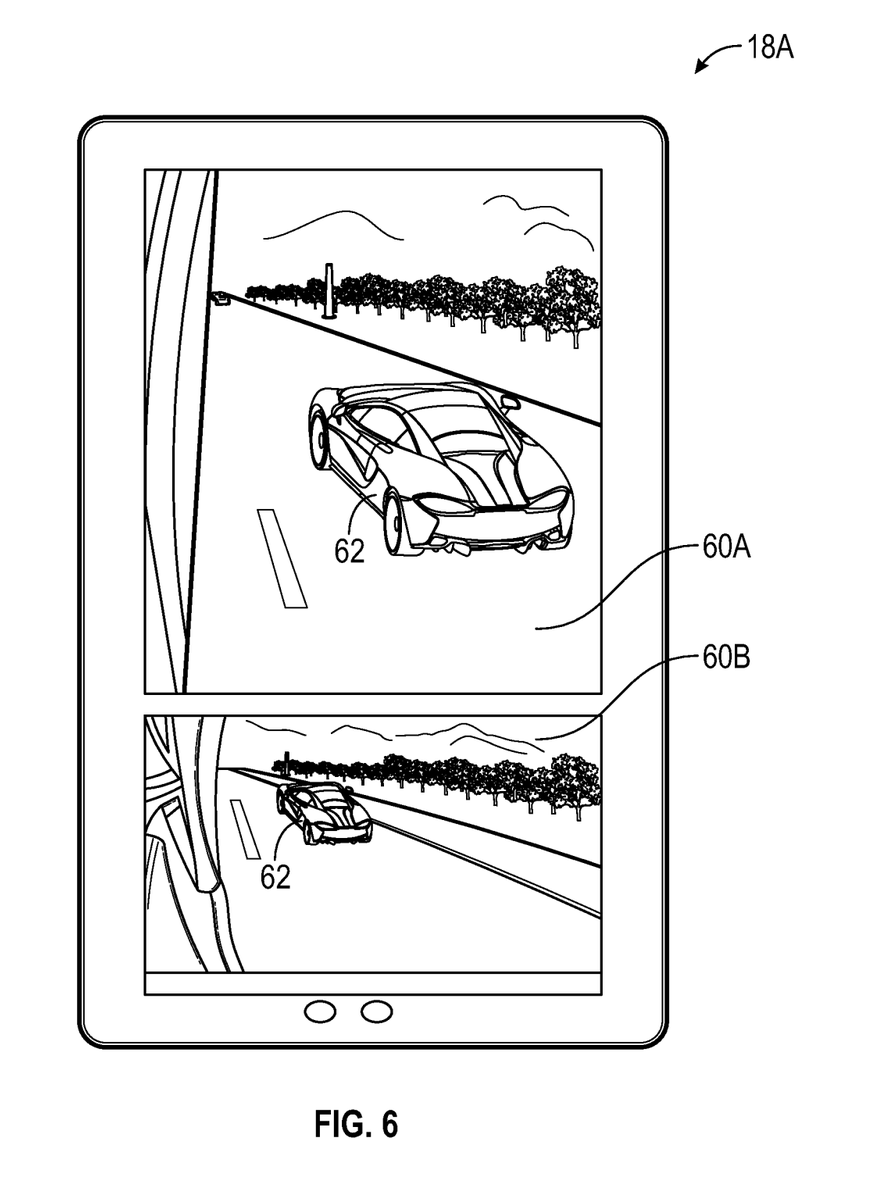
FIG. 6 schematically illustrates an example display from the CMS of FIG. 1A.

The ECU 30 uses an object detection algorithm to detect the one or more objects in step 106, such as the vehicle 62 shown in FIG. 6 (step 106). The ECU 30 gives the vehicle occupant an opportunity to select the object 62 for tracking, and receives the selection (step 108). The selection may be received through the user interface 38 (e.g., as a touchscreen command by touching the display 18A or another display in the vehicle 10), as a voice command (e.g., "Track object 1"), or with a hand gesture that the ECU 30 is configured to recognize (e.g., a hand swipe, a finger point, a first extending a number of fingers correspond to a number of the selected object, etc.), for example.

In one example, the ECU 30 notifies the vehicle occupant that the one or more objects have been detected through one or more of the displays 18 and/or through the speaker 40, which then prompts the vehicle occupant for a selection. For example, the ECU 30 may detect 2 objects and number each one and then emit a sound saying "Select object 1 or object 2," to which the vehicle occupant can respond.

In one example, once the object selection is received, the ECU 30 provides an indication of the selected object on the display 18, such as by shading the object and/or placing a border around the selected object on the display 18 (e.g., a colored border in a bright color that has a high degree of contrast with the rest of what is displayed on the display 18).

Once the object selection has been received, the ECU 30 adjusts the video feed provided on the display 18 to keep the selected object in a field of view of the video feed as the object moves relative to the vehicle 10 (step 110). This may be performed as soon as the object 62 gets within a pre-defined distance of a border of the field of view (e.g., a certain number of pixels), for example.

In one example, step 110 includes adjusting the video feed by adjusting a panning and/or magnification of the video feed. For example, the adjustment may include adjusting a magnification of the video feed such that the selected object 62 remains in the field of view after magnification. In the same or another example, the adjustment includes adjusting a panning of the video feed to keep the object in the field of view of the video feed, which may be achieved by adjusting a cropping of the video feed from the camera 20*a* and/or by rotating the camera 20A.

In one example, the ECU 30 adjusts the video feed by switching which camera 20 is used to provide the video feed. In one particular example, prior to the adjustment, the video feed includes images from a first camera (e.g., camera 20*f*) and excludes images from a second camera (e.g., camera 20C), and after the adjustment the video feed includes images of the object from the second camera (e.g., camera 20C).

Figure 7:
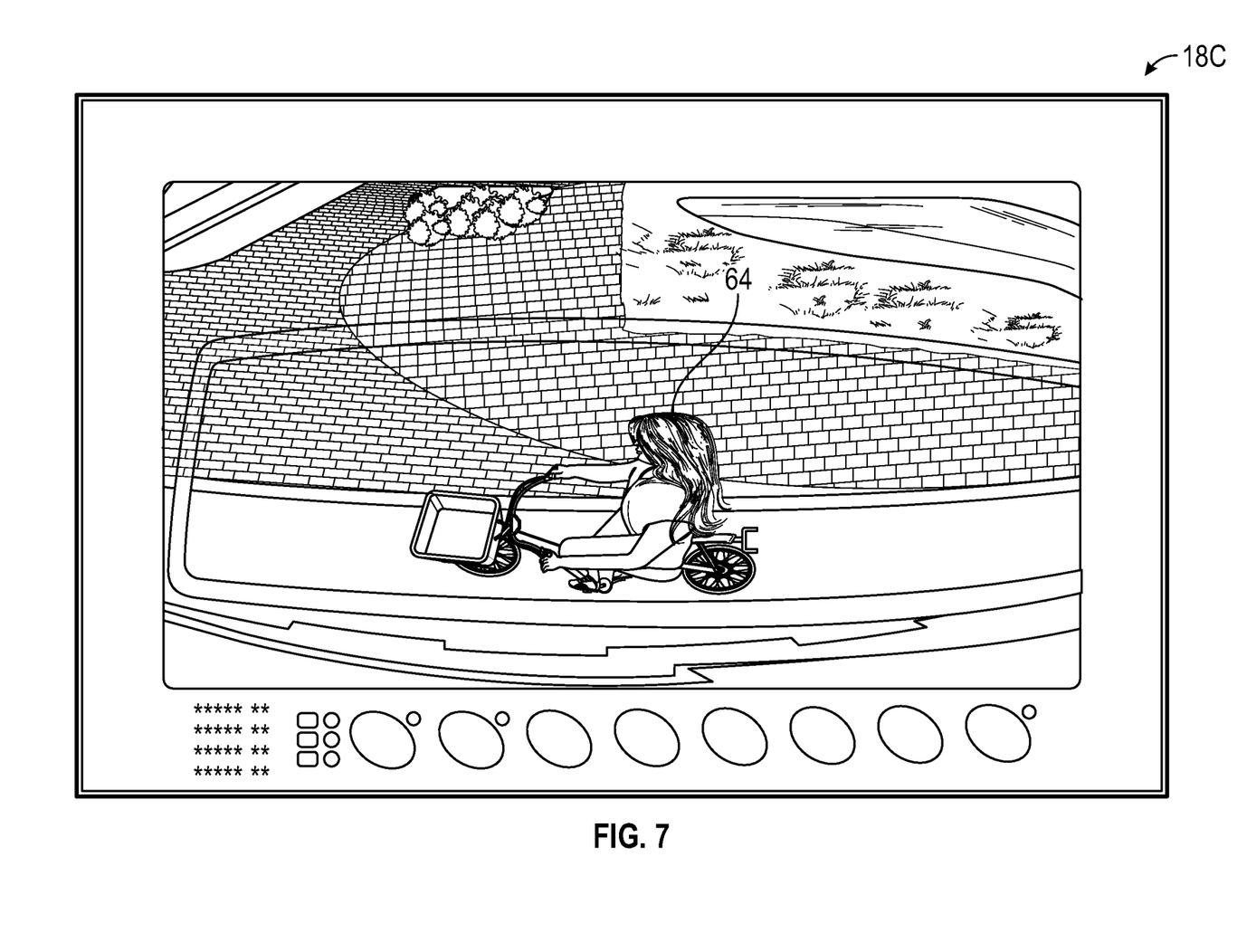
FIG. 7 schematically illustrates an example display from the CMS of FIG. 1A.

FIG. 7 schematically shows an example of the display 18*c* which includes an image of a cyclist 64 from camera 20*f*. the ECU 30 identifies the cyclist 64 as an object, and receives a selection of that objects by the vehicle occupant. The ECU 30 then adjusts the video feed provided on the display 18*c* to keep the selected object in a field of view of the video feed as the object moves relative to the vehicle. This could include switching to a feed from camera 20*c* if the cyclist 62 turns in front of the vehicle 10 and/or could include adjusting a magnification or panning of the video feed from the camera 20*f*, for example.

The tracking mode could be useful for garbage trucks, for example, where sanitation workers generally ride at an exterior back corner of the vehicle while holding on to a handle of the vehicle. A driver of the garbage truck would likely want to keep the sanitation workers in view, and could use the tracking mode to achieve this.

The tracking mode could also be useful when a vehicle is parked. If a suspicious individual is walking around the trailer 14 of a commercial vehicle 10, the driver may want to monitor the behavior of the suspicious individual to ensure they are not vandalizing the trailer 14 or attempting to steal from the trailer 14. The driver could use the tracking mode to follow the suspicious individual as they walk around the vehicle 10 (e.g., from camera 20B, to camera 20D, and then to camera 20A, for example.

Figure 8:
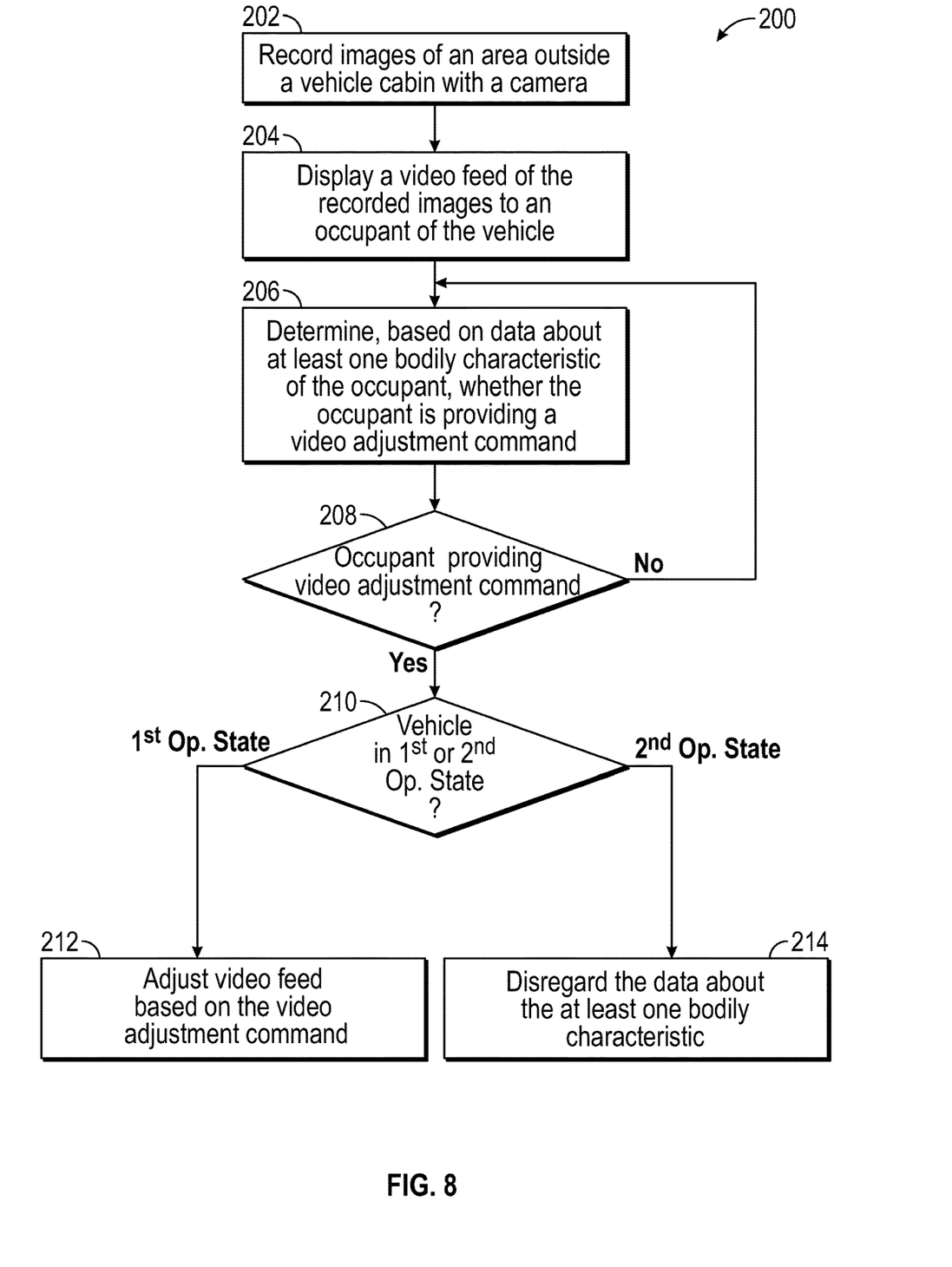
FIG. 8 is a flowchart of a method for adjusting a video feed of a camera mirror system.

FIG. 8 is a flowchart 200 of another method for adjusting a video feed for the camera mirror system 15. Images are recorded of an area outside of vehicle cabin 22 of vehicle 10 using a camera 20 (step 202), and a video feed of the recorded images is displayed to an occupant of the vehicle cabin 22 (e.g., on a display 18 disposed within the vehicle cabin 22) (step 204).

The ECU 30 obtains data about at least one bodily characteristic of the vehicle occupant from one or more sensors (e.g., cabin cameras 28*a-b* and/or gaze tracking sensor 31), and based on that data determines if the vehicle occupant is providing a video adjustment command (step 206).

If the vehicle occupant is providing a video adjustment command (a "yes" to step 208), the ECU 30 determines whether the vehicle 10 is operating in a first operational state or a second operational state.

If the vehicle 10 is in the first operational state, the ECU 30 adjusts the video feed on the display 18 based on the video adjustment command (step 212). However, if the vehicle is in the second operational state, the ECU 30 disregards the data about the at least one bodily characteristic (step 214). The disregarding of step 214 may include maintaining a current video feed (e.g., not adjusting a current field of view and/or current magnification level).

In one example, the video adjustment command corresponds to the vehicle occupant looking at the display 18 and attempting to look outside a current field of view of the video feed on the display 18 as if the display 18 represents a conventional sideview mirror. Bodily characteristics that could be indicative of this video adjustment command include any one or more of a gaze of the vehicle occupant, a head tilt of the vehicle occupant (e.g., tilting to the right or left), and a bodily pose of the vehicle occupant (e.g., head turned with respect to torso). In one example, the ECU 30 determines that a video adjustment command is provided for panning if the vehicle occupant's gaze is focused on an edge area of the display (e.g., a right or left edge), or within a predefined proximity of the edge area, and the occupant is doing one or more of the following (1) leaning to the right or the left, (2) tilting their head to the right or left, (3) staring at the edge area or area in predefined proximity to edge area for more than a threshold amount of time (e.g., 2 seconds).

In one example, the video adjustment command corresponds to the vehicle occupant leaning forward or backward from an initial position, with a forward lean indicating a zoom in request and a backward lean indicating a zoom out request. In one such example, the ECU 30 zooms the video feed on the display 18 (e.g., an optical zoom or a digital zoom) based on how long the vehicle occupant leans, how many times the vehicle occupant leans, and/or how much the vehicle occupant is leaning with respect to the initial position.

In one example, the first vehicle operational state corresponds to a magnitude of one of a deceleration and an acceleration of the vehicle 10 being less than a predefined threshold, and the second vehicle operational state corresponds to the magnitude of said one of the deceleration and the acceleration of the vehicle 10 being greater than the predefined threshold. When a vehicle rapidly accelerates or decelerates this may cause head and/or torso movements that are unrelated to a desire to adjust a field of view on the display 18, but result in a different vehicle occupant pose. By using the driving conditions of the second vehicle operational state, movements due to such acceleration and/or deceleration can be ignored (e.g., to maintain a consistent field of view on the display) when those movements may otherwise be interpreted as the vehicle occupant trying to look outside a field of view of one of the displays.

The determination by the ECU 30 of whether a vehicle occupant is looking at a particular display and trying to look outside a current field of view of the display may be based on an estimated distance between the vehicle occupant's head and the display in question and/or the vehicle occupant's head position in relation to a static reference point in the vehicle cabin 22, for example. In one example, the ECU 30 uses machine learning through one or more neural networks stored in the memory 52 which are trained with historical training data corresponding to poses indicating a vehicle occupant looking at a particular display and trying to look outside a field of view of the display.

Some non-limiting examples of how step 212 from FIG. 8 may be implemented are discussed in the examples below.

| ECO video feed adjustment | Bodily Characteristic/Video Adjustment Command |
| --- | --- |
| ECU 30 zooms in to magnify what is shown on a particular display | Vehicle occupant leans forward from an initial torso position (optionally towards the particular display) for a predefined time duration (e.g., 3 seconds)<br>Vehicle occupant tilts head forward from an initial head position (optionally towards the particular display) for the predefined time duration<br>Vehicle occupant lifts hand (optionally towards the particular display) with fingertips touching, and expands fingers away from each other |
| ECU 30 zooms out to shrink what is shown on a particular display | Vehicle occupant leans backward from an initial torso position (optionally away from the particular display) for the predefined time duration<br>Vehicle occupant tilts head backward from an initial head position (optionally away from the particular display) for the predefined time duration<br>Vehicle occupant lifts hand (optionally towards the particular display) with fingertips spread, and moves fingers so that fingertips are touching |
| ECU 30 pans to the left for the particular display | Vehicle occupant has eyes focused on or within predefined proximity of left edge of the particular display for the predefined time duration (optionally also while their head is rotated to the left and/or they are leaning forward)<br>Vehicle occupant tilts head to the left for the predefined time duration by a predefined amount (e.g., a predefined distance and/or angle of rotation for a resting head position)<br>Vehicle occupant lifts hand (optionally towards the particular display) and makes a gesture swiping to the left |
| ECO pans to the right for the particular display | Vehicle occupant has eyes focused on or within predefined proximity of right edge of the particular display for the predefined time duration (optionally also while their head is rotated to the right and/or they are leaning forward)<br>Vehicle occupant tilts head to the right for the predefined time duration by a predefined amount (e.g., a predefined distance and/or angle of rotation for a resting head position)<br>Vehicle occupant lifts hand (optionally towards the particular display) and makes a gesture swiping to the right |

As discussed in the examples above, some bodily characteristics that may be utilized by the ECU 30 to determine a video adjustment command include:
- vehicle occupant head rotation direction (e.g., to the left or to the right as compared to a non-rotated position that faces forwards);
- vehicle occupant head tilt direction (e.g., forward or backward as compared to a non-tilted position to indicate a zoom command; and/or leftward or rightwards as compared to the non-tilted position to indicate a panning command);
- vehicle occupant torso lean direction (e.g., forward or backwards as compared to a non-leaning seated position, such as a resting seated position);
- vehicle occupant gaze direction; and
- vehicle occupant hand movement (e.g., swipe left or right) and/or finger movement (pinching to expand fingers away from each other or bringing fingers towards each other, such as into a pinch).

As discussed in the table above, these various bodily characteristics may be utilized to determine if a vehicle occupant is looking at a display and attempting to look outside a current field of view of the display.

In one example, the ECU 30 is operable to automatically adjust a field of view of one of the displays 18A-B when the vehicle 10 turns so that the trailer 14 maintains a consistent position in the video feed. In one such example, disregarding the data from the DMS 29 about the bodily characteristic of the vehicle occupant corresponds to the ECU 30 panning during the turning but doing so only based on the turning status of the vehicle, and not based on a bodily characteristic of the vehicle occupant.

In one example, to adjust the field of view of the video feed, the ECU 30 determines, based on the data from at least one sensor (e.g., cabin cameras 28*a-b* and/or gaze tracking sensor 31), an area of interest outside the video feed that the vehicle occupant is trying to view, and adjusts the field of view of the video feed so that the video feed on the display includes the area of interest. This could include panning to the right or left, for example. As discussed above, panning may be achieved by adjusting how the video feed is cropped for display 18 (e.g., if the raw image data includes a broader field of view than is being displayed) and/or commanding the camera 20 to mechanically adjust the lens to point in a different direction.

Figure 9A:
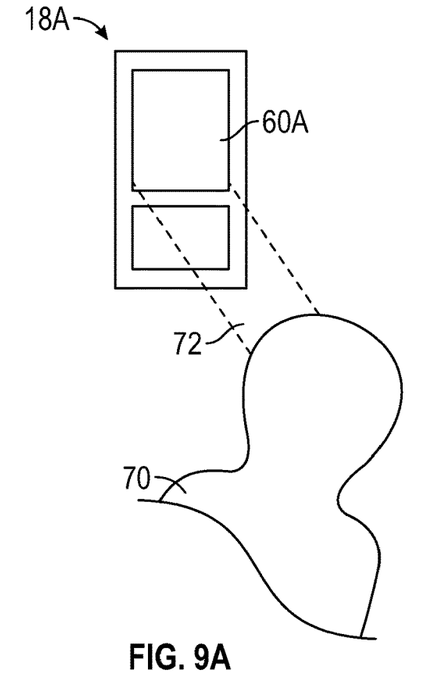
FIG. 9A is a schematic view of a vehicle occupant attempting to look outside a field of view of a CMS display.

FIGS. 9A-B are schematic views of a vehicle occupant 70 (e.g., a driver) attempting to look outside a field of view of a CMS display 18. In FIG. 9A, the vehicle occupant 70 is looking at the display area 60A of display 18*a* (as indicated by gaze 72), and they are tilting their head and/or generally leaning to the right. The ECU 30 may interpret this as the vehicle occupant 70 trying to look outside a current field of view of the video feed on the display area 60A, and may adjust the video feed accordingly (e.g., by panning right).

Figure 9B:
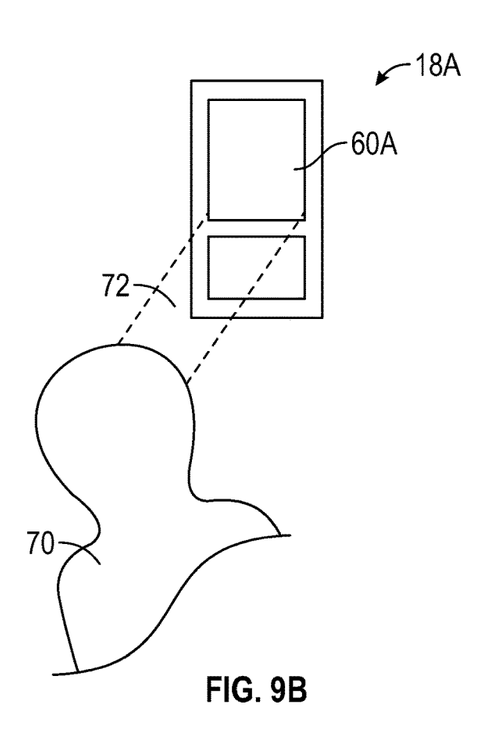
FIG. 9B is another schematic view of a vehicle occupant attempting to look outside a field of view of a CMS display.

In FIG. 9B, the vehicle occupant 70 is looking at the display area 60A of display 18*a* (as indicated by gaze 72), and they are tilting their head and/or generally leaning to the left. The ECU 30 may interpret this as the vehicle occupant 70 trying to look outside a current field of view of the video feed on the display area 60A, and may adjust the video feed accordingly (e.g., by panning left).

It is understood that the various embodiments depicted in the figures are non-limiting examples, and that variations are contemplated within the scope of this disclosure. For example, one or more items of FIG. 3 could be omitted (e.g., the gaze tracking sensor 31 and/or microphone 42) in some embodiments, and different quantities of cameras and displays may be provided than are shown in FIGS. 1A-C. Also, the method corresponding to the flowchart 200 in FIG. 8 may be performed with or without gaze tracking.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A vehicle display system, comprising:
a camera configured to provide a video feed of an area outside a vehicle;
a display configured to display the video feed to an occupant of the vehicle;
at least one sensor configured to obtain data about at least one bodily characteristic of a vehicle occupant; and
a processor operatively connected to the camera, display, and at least one sensor, and configured to:
determine, based on the data from the at least one sensor, whether the vehicle occupant is providing a video adjustment command for the video feed on the display;
determine a magnitude of one of deceleration and acceleration of the vehicle;
adjust the video feed on the display based on the video adjustment command being provided during a first vehicle operational state; and
disregard the data about the at least one bodily characteristic of the vehicle occupant obtained during a second vehicle operational state that is different from the first vehicle operational state;
wherein the first vehicle operational state corresponds to the determined magnitude of said one of deceleration and acceleration of the vehicle being non-zero and less than a predefined threshold; and
wherein the second vehicle operational state corresponds to the determined magnitude of said one of deceleration and acceleration of the vehicle being non-zero and greater than the predefined threshold.

2. The vehicle display system of claim 1, wherein the at least one bodily characteristic includes at least one of a gaze direction, a head rotation direction, a head tilt direction, and a torso lean direction.

3. The vehicle display system of claim 1, wherein the at least one bodily characteristic includes a hand movement, a finger movement, or both.

4. The vehicle display system of claim 1, wherein to adjust the video feed on the display, the processor is configured to:
determine, based on the data from the at least one sensor, an area of interest outside the video feed that the vehicle occupant is trying to view; and
adjust a field of view of the video feed so that the video feed on the display includes the area of interest.

5. The vehicle display system of claim 1, wherein:
the display is configured to display a cropped version of the video feed; and
to adjust the video feed on the display, the processor is configured to adjust a cropping of the video feed.

6. The vehicle display system of claim 1, wherein:
the video adjustment command corresponds to at least one of the occupants leaning their torso forward or backward from an initial torso position, and the occupant tilting their head forwards or backwards from an initial head position; and
to adjust the video feed on the display, the processor is configured to adjust a magnification of the video feed on the display.

7. The vehicle display system of claim 1, wherein the processor is also configured to receive video adjustment commands as voice commands or gesture commands.

8. The vehicle display system of claim 1, wherein said one of deceleration and acceleration of the vehicle is deceleration of the vehicle.

9. The vehicle display system of claim 1, wherein said one of deceleration and acceleration of the vehicle is acceleration of the vehicle.

10. A method comprising:
recording images of an area outside a vehicle cabin with a camera;
displaying a video feed of the recorded images to an occupant of the vehicle in the vehicle cabin;
determining, based on data about at least one bodily characteristic of a vehicle occupant from at least one sensor, whether the vehicle occupant is providing a video adjustment command for the video feed on the display;
determining a magnitude of one of deceleration and acceleration of the vehicle;
adjusting the video feed on the display based on the video adjustment command being provided during a first vehicle operational state; and
disregarding the data about the at least one bodily characteristic of the vehicle occupant obtained during a second vehicle operational state that is different from the first vehicle operational state;

wherein the first vehicle operational state corresponds to the determined magnitude of said one of deceleration and acceleration of the vehicle being non-zero and less than a predefined threshold; and wherein the second vehicle operational state corresponds to the determined magnitude of said one of deceleration and acceleration of the vehicle being non-zero and greater than the predefined threshold.

11. The method of claim 10, wherein the at least one bodily characteristic includes at least one of: a gaze direction, a head rotation direction, a head tilt direction, a torso lean direction, a hand movement, a finger movement.

12. The method of claim 10, wherein said adjusting the video feed on the display includes at least one of:
adjusting a cropping of the video feed on the display;
adjusting a magnification of the video feed on the display;
adjusting a field of view of the video feed on the display.

13. The method of claim 10, wherein adjusting the video feed on the display includes:
determining, based on the data from the at least one sensor, an area of interest outside the video feed that the vehicle occupant is trying to view; and
adjusting a field of view of the video feed so that the video feed on the display includes the area of interest.

14. The method of claim 10, wherein said one of deceleration and acceleration of the vehicle is deceleration of the vehicle.

15. The method of claim 10, wherein said one of deceleration and acceleration of the vehicle is acceleration of the vehicle.

* * * * *